(12) United States Patent
Kitsukawa et al.

(10) Patent No.: US 9,046,104 B2
(45) Date of Patent: Jun. 2, 2015

(54) TURBOCHARGER SYSTEM WITH ELECTRIC MOTOR ASSIST FOR HIGH PRESSURE TURBOCHARGER

(75) Inventors: Isao Kitsukawa, Fujisawa (JP); Tomohiro Sugano, Fujisawa (JP); Yoshiyuki Abe, Fujisawa (JP); Haruyo Kimura, Fujisawa (JP); Akira Iijima, Fujisawa (JP); Naoki Ishibashi, Fujisawa (JP); Syougo Sakashita, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 132 days.

(21) Appl. No.: 13/882,079

(22) PCT Filed: Oct. 26, 2011

(86) PCT No.: PCT/JP2011/074653
§ 371 (c)(1),
(2), (4) Date: Apr. 26, 2013

(87) PCT Pub. No.: WO2012/057191
PCT Pub. Date: May 3, 2012

(65) Prior Publication Data
US 2013/0209291 A1 Aug. 15, 2013

(30) Foreign Application Priority Data
Oct. 29, 2010 (JP) .................................. 2010-244386

(51) Int. Cl.
*F02B 37/013* (2006.01)
*F02B 37/10* (2006.01)
(Continued)

(52) U.S. Cl.
CPC .............. *F04D 13/06* (2013.01); *F02B 37/013* (2013.01); *F02B 37/10* (2013.01); *F02B 37/16* (2013.01);
(Continued)

(58) Field of Classification Search
USPC ............................................. 60/612; 123/562
See application file for complete search history.

(56) References Cited

U.S. PATENT DOCUMENTS

| | | | | |
|---|---|---|---|---|
| 7,805,939 B2 * | 10/2010 | Kimoto et al. | .................. | 60/612 |
| 8,281,588 B2 * | 10/2012 | Garrett et al. | .................. | 60/612 |
| 2007/0033938 A1 * | 2/2007 | Ueno | .............................. | 60/612 |

FOREIGN PATENT DOCUMENTS

| | | |
|---|---|---|
| JP | 02-75724 | 3/1990 |
| JP | 2005-9315 | 1/2005 |

(Continued)

OTHER PUBLICATIONS

Written Opinion of the International Searching Authority mailed Nov. 22, 2011 in corresponding International Application No. PCT/JP2011/074653.

(Continued)

*Primary Examiner* — Mary A Davis
(74) *Attorney, Agent, or Firm* — Staas & Halsey LLP

(57) ABSTRACT

A turbocharger system includes: a high-pressure stage turbocharger including a high-pressure stage turbine disposed on an exhaust passage and driven by exhaust, and a high-pressure stage compressor disposed on an intake passage and driven by a rotational torque of the high-pressure stage turbine; and a low-pressure stage turbocharger including a low-pressure stage turbine disposed on the exhaust passage of a more downstream side than the high-pressure stage turbine and driven by exhaust, and a low-pressure stage compressor disposed on the intake passage of a more upstream side than the high-pressure stage compressor and driven by a rotational torque of the low-pressure stage turbine, wherein the high-pressure stage turbocharger includes an electric motor that assists a drive force of the high-pressure stage compressor.

3 Claims, 2 Drawing Sheets

(51) Int. Cl.

| | | |
|---|---|---|
| *F02B 37/16* | (2006.01) | |
| *F02B 37/18* | (2006.01) | |
| *F02B 39/10* | (2006.01) | |
| *F02B 37/04* | (2006.01) | |
| *F04D 13/06* | (2006.01) | |
| *F02D 23/00* | (2006.01) | |
| *F02B 37/00* | (2006.01) | |

(52) U.S. Cl.
CPC ................. *F02B 37/18* (2013.01); *F02B 39/10* (2013.01); *F02D 23/00* (2013.01); *Y02T 10/144* (2013.01); *F02B 37/004* (2013.01)

(56) References Cited

FOREIGN PATENT DOCUMENTS

| | | | | |
|---|---|---|---|---|
| JP | 2005009315 A | * | 1/2005 | ............ F02B 37/013 |
| JP | 2006-177171 | | 7/2006 | |
| JP | 2008-223527 | | 9/2008 | |
| JP | 2008223527 A | * | 9/2008 | |
| JP | 2009-270475 | | 11/2009 | |
| JP | 2010-209735 | | 9/2010 | |
| JP | 2010209735 A | * | 9/2010 | |
| JP | 2010-236429 | | 10/2010 | |

OTHER PUBLICATIONS

Patent Abstracts of Japan, Publication No. 02-075724, Published Mar. 15, 1990.
Patent Abstracts of Japan, Publication No. 2005-009315, Published Jan. 13, 2005.
Patent Abstracts of Japan, Publication No. 2006-177171, Published Jul. 6, 2006.
Patent Abstracts of Japan, Publication No. 2008-223527, Published Sep. 25, 2008.
Patent Abstracts of Japan, Publication No. 2009-270475, Published Nov. 19, 2009.
Patent Abstracts of Japan, Publication No. 2010-209735, Published Sep. 24, 2010.
Patent Abstracts of Japan, Publication No. 2010-236429, Published Oct. 21, 2010.
Seiichi Ibaraki et al., "Development of the "Hybrid Turbo," an Electrically Assisted Turbocharger," Mitsubishi Heavy Industries Ltd. Technical Review, vol. 43, No. 3 (Sep. 2006) p. 36-40.
International Search Report of PCT/JP2011/074653 mailed Nov. 22, 2011.

* cited by examiner

TURBOCHARGER SYSTEM WITH ELECTRIC MOTOR ASSIST FOR HIGH PRESSURE TURBOCHARGER

CROSS REFERENCE TO RELATED APPLICATION

This application claims the foreign priority benefit of Japanese Application No. 2010-244386 filed Oct. 29, 2010, the contents of which are incorporated herein by reference, which serves as priority for PCT Application No. JP2011/074653 filed Oct. 26, 2011.

TECHNICAL FIELD

The present invention relates to a turbocharger system in which a high-pressure stage turbocharger and a low-pressure stage turbocharger are connected in series.

BACKGROUND ART

Recently, for improving vehicle fuel efficiency and reducing $CO_2$ emission, the development of technology has been actively made to reduce an engine displacement (engine downsizing) or increase a gear ratio (high geared) and ensure power performance by a supercharger such as a turbocharger.

As a turbocharger system used at this time, there has been proposed a two-stage turbo that uses two turbochargers having different capacities and switches a turbocharger to be used in an operating zone. As the two-stage turbo, there are a parallel two-stage turbo in which two turbochargers are connected in parallel, and a series two-stage turbo in which two turbochargers are connected in series (see, for example, Patent Document 1).

In the series two-stage turbo, two-stage supercharging using both of a high-pressure stage turbocharger and a low-pressure stage turbocharger is enabled. Therefore, as compared with the parallel two-stage turbo, the series two-stage turbo is characterized in that it is possible to obtain a high boost pressure in a middle-low speed range.

PRIOR ART DOCUMENTS

Patent Document 1: JP 2009-270475 A
Patent Document 2: JP 2006-177171 A
Patent Document 3: JP 2010-209735 A
Non-Patent Document 1: "Development of Power-Assisted Turbocharger 'Hybrid Turbo'", IBARAKI Seiichi and four others, Mitsubishi Heavy Industries Technical Review, Vol. 43, No. 3, 2006, p. 36-40

However, even the series two-stage turbo, which can easily obtain a high boost pressure in a middle-low speed range, has a problem in that exhaust energy is deficient and a sufficient boost pressure cannot be obtained in a very low speed range, for example, at the time of vehicle start.

SUMMARY OF THE INVENTION

Therefore, an object of the present invention is to solve the above problem and provide a turbocharger system capable of obtaining a sufficient boost pressure even when an engine speed is within an extremely low speed range.

The present invention has been made to achieve the above object and provide a turbocharger system including: a high-pressure stage turbocharger including a high-pressure stage turbine disposed on an exhaust passage and driven by exhaust, and a high-pressure stage compressor disposed on an intake passage and driven by a rotational torque of the high-pressure stage turbine; and a low-pressure stage turbocharger including a low-pressure stage turbine disposed on the exhaust passage of a more downstream side than the high-pressure stage turbine and driven by exhaust, and a low-pressure stage compressor disposed on the intake passage of a more upstream side than the high-pressure stage compressor and driven by a rotational torque of the low-pressure stage turbine, wherein the high-pressure stage turbocharger includes a power-assisted turbocharger including an electric motor that assists a drive force of the high-pressure stage compressor.

The turbocharger system may include an electric motor control unit that drives the electric motor when a boost pressure, which is an outlet pressure of the high-pressure stage compressor, is smaller than a target boost pressure, which is determined by an engine speed and an engine torque.

The turbocharger system may include: a boost pressure sensor that measures the boost pressure, which is the outlet pressure of the high-pressure stage compressor, and a target boost pressure map in which the target boost pressure is set for each engine speed and engine torque; an intake air flow rate measurement unit that measures an intake air flow rate; an inlet pressure sensor that measures an inlet pressure of the high-pressure stage compressor; and a high-pressure stage compressor characteristics map that is a relationship of a pressure ratio of the inlet pressure and the boost pressure with respect to the intake air flow rate for each turbo rotational speed in the high-pressure stage compressor, wherein the electric motor control unit calculates a target pressure ratio from a ratio of the inlet pressure measured by the inlet pressure sensor and the target boost pressure, calculates a target turbo rotational speed by referring to the high-pressure stage compressor characteristics map at the target pressure ratio and the intake air flow rate measured by the intake air flow rate measurement unit, and controls a drive amount by the electric motor according to a discrepancy between the calculated target turbo rotational speed and a current turbo rotational speed.

According to the present invention, it is possible to provide a turbocharger system capable of obtaining a sufficient boost pressure even when an engine speed is within an extremely low speed range.

DETAILED DESCRIPTION

Hereinafter, embodiments of the present invention will be described with reference to the accompanying drawings.

Figure 1:
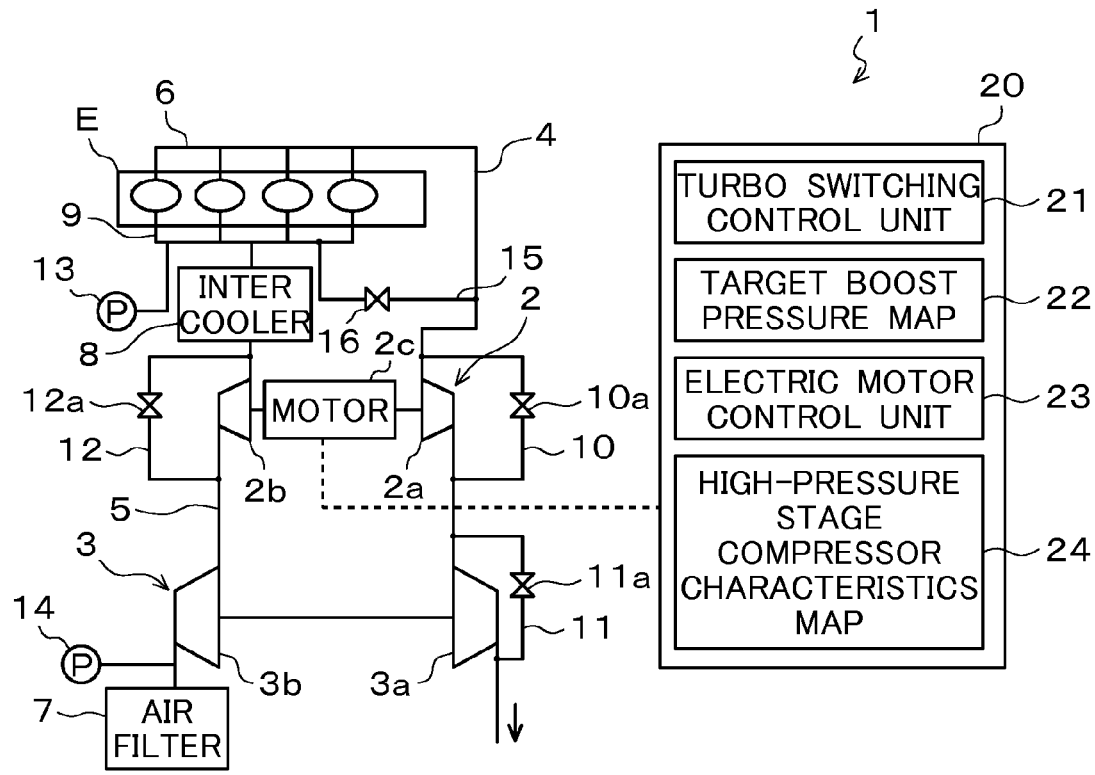
FIG. 1 is a schematic configuration diagram of an engine system using a turbocharger system according to an embodiment of the present invention.

FIG. 1 is a schematic configuration diagram of an engine system using a turbocharger system according to an embodiment.

As illustrated in FIG. 1, the turbocharger system 1 is provided with a series two-stage turbo in which a high-pressure stage turbocharger 2 and a low-pressure stage turbocharger 3 are connected in series. Generally, the high-pressure stage turbocharger 2 has a low capacity and the low-pressure stage turbocharger 3 has a high capacity, but the magnitude of the capacity is not specially limited.

The high-pressure stage turbocharger 2 includes a high-pressure stage turbine 2a disposed on an exhaust passage 4 of an engine E and driven by exhaust, and a high-pressure stage compressor 2b disposed on an intake passage 5 and driven by a rotational torque of the high-pressure stage turbine 2a.

The low-pressure stage turbocharger 3 includes a low-pressure stage turbine 3a disposed on the exhaust passage 4 of a more downstream side than the high-pressure stage turbine 2a and driven by exhaust, and a low-pressure stage compressor 3b disposed on the intake passage 5 of a more upstream side than the high-pressure stage compressor 2b and driven by a rotational torque of the low-pressure stage turbine 3a.

The most upstream of the exhaust passage 4 is connected to an exhaust manifold 6 of the engine E. In the exhaust passage 4 of the downstream side, the high-pressure stage turbine 2a and the low-pressure stage turbine 3a are provided in turn. In the most upstream of the intake passage 5, an air filter 7 is provided. In the intake passage 5 of the downstream side, the low-pressure stage compressor 3b, the high-pressure stage compressor 2b, and an intercooler 8 are provided in turn. The most downstream of the intake passage 5 is connected to an intake manifold 9 of the engine E.

Also, in the exhaust passage 4, a high-pressure stage turbine bypass line 10 which bypasses the high-pressure stage turbine 2a, and a low-pressure stage turbine bypass line 11 which bypasses the low-pressure stage turbine 3a, are provided, respectively. In the high-pressure stage turbine bypass line 10 and the low-pressure stage turbine bypass line 11, a high-pressure stage turbine bypass valve 10a and a low-pressure stage turbine bypass valve 11a are provided, respectively. Also, in the intake passage 5, a high-pressure stage compressor bypass line 12 is provided to bypass the high-pressure stage compressor 2b. In the high-pressure stage compressor bypass line 12, a high-pressure stage compressor bypass valve 12a is provided.

Furthermore, the turbocharger system 1 includes a boost pressure sensor 13 which measures a boost pressure being an outlet pressure of the high-pressure stage compressor 2b, an inlet pressure sensor 14 which measures an inlet pressure of the high-pressure stage compressor 2b, and an intake air flow rate measurement unit, not illustrated, (for example, MAF sensor) which measures an intake air flow rate. The boost pressure sensor 13 is provided in the intake manifold 9, and the inlet pressure sensor 14 is provided on the intake passage 5 of the upstream side of the low-pressure stage compressor 3b. Also, in a zone where the low-pressure stage turbocharger 3 is not used, such as a zone where an engine speed is within an extremely low range, a measured value of the inlet pressure sensor 14 is substantially equal to the inlet pressure of the high-pressure stage compressor 2b.

The turbocharger system 1 includes a turbo switching control unit 21 which switches the turbochargers 2 and 3 to be used according to an engine speed and an engine torque (load). The turbo switching control unit 21 is embedded into an electronic control unit (ECU) 20 as a program.

In a zone where the engine speed is low and the exhaust energy is small, the turbo switching control unit 21 closes the high-pressure stage turbine bypass valve 10a and the high-pressure stage compressor bypass valve 12a, and drives the high-pressure stage turbocharger 2. At this time, exhaust gas is also supplied to the low-pressure stage turbine 3a, and the low-pressure stage turbocharger 3 is driven by the remaining exhaust energy. However, in the zone where the engine speed is low and the exhaust energy is small, the low-pressure stage turbine 3a cannot almost work, and only the high-pressure stage turbocharger 2 is nearly operated.

Also, in a zone where the engine speed is high and the exhaust energy is large, the turbo switching control unit 21 opens the high-pressure stage turbine bypass valve 10a and the high-pressure stage compressor bypass valve 12a, and closes the low-pressure stage turbine bypass valve 11a to drive only the low-pressure stage turbocharger 3, so as to suppress the deterioration of the fuel efficiency due to the over speed of the high-pressure stage turbocharger 2 and the abnormal rise of the exhaust pressure. Also, in a zone where the engine speed becomes higher and exceeds the capacity of the low-pressure stage turbocharger 3, the low-pressure stage turbine bypass valve 11a is opened, and the deterioration of the fuel efficiency due to the over speed of the low-pressure stage turbocharger 3 and the abnormal rise of the exhaust pressure is suppressed.

Furthermore, in a middle zone between the zone where the engine speed is low and the zone where the engine speed is high, the turbo switching control unit 21 closes the low-pressure stage turbine bypass valve 11a and the high-pressure stage compressor bypass valve 12a, and adjusts an opening degree of the high-pressure stage turbine bypass valve 10a to drive both of the high-pressure stage turbocharger 2 and the low-pressure stage turbocharger 3 at a ratio corresponding to the opening degree of the high-pressure stage turbine bypass valve 10a.

The turbocharger system 1 according to the present embodiment uses a power-assisted turbocharger (hybrid turbo), including an electric motor 2c that assists a drive force of the high-pressure stage compressor 2b (assists a rotational torque of the high-pressure stage turbine 2a), as the high-pressure stage turbocharger 2. The electric motor 2c is integrally provided with a turbo shaft that connects the high-pressure stage turbine 2a and the high-pressure stage compressor 2b, more particularly, a turbine wheel of the high-pressure stage turbine 2a and a compressor wheel of the high-pressure stage compressor 2b. The electric motor 2c is provided with, for example, a DC servomotor. Also, since the electric motor 2c is integrally provided with the turbo shaft, a rotational speed of the electric motor 2c is equal to a rotational speed (turbo rotational speed) of the high-pressure stage turbocharger 2.

The turbocharger system 1 includes a target boost pressure map 22 in which a target boost pressure is set for each engine speed and engine torque, and an electric motor control unit 23 that drives the electric motor when the boost pressure detected by the boost pressure sensor 13 is smaller than the target boost pressure obtained by referring to the target boost pressure map 22 at the engine speed and the engine torque.

Also, the turbocharger system 1 includes a high-pressure stage compressor characteristics map 24 that is a relationship of a pressure ratio of the inlet pressure and the boost pressure with respect to the intake air flow rate for each turbo rotational speed in the high-pressure stage compressor 2b. The electric motor control unit 23 calculates a target pressure ratio from a ratio of the inlet pressure measured by the inlet pressure sensor 14 and the target boost pressure, also calculates a target turbo rotational speed by referring to the high-pressure stage compressor characteristics map 24 at the target pressure ratio and the intake air flow rate measured by the intake air flow rate measurement unit, and controls a drive amount (assist amount) by the electric motor 2c according to a discrepancy between the calculated target turbo rotational speed and the current turbo rotational speed.

The target boost pressure map 22, the electric motor control unit 23, and the high-pressure stage compressor characteristics map 24 are mounted on the ECU 20. Also, in the ECU 20, all engine parameters, such as the engine speed or the fuel injection amount, are recognized so as to perform the control of the engine E.

Hereinafter, the control of the assist amount by the electric motor 2c will be described in detail.

In the turbocharger system 1, first, the electric motor control unit 23 calculates the target boost pressure by referring to the target boost pressure map 22 at the engine speed and the engine torque. An example of the target boost pressure map 22 used at this time is illustrated in FIG. 2.

Figure 2:
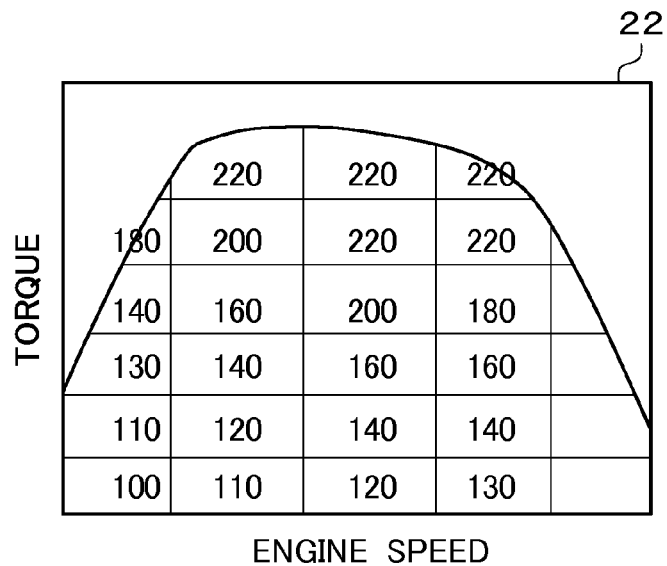
FIG. 2 is a diagram illustrating an example of a target boost pressure map used in the turbocharger system of FIG. 1.

As illustrated in FIG. 2, the target boost pressure map 22 is a map in which the target boost pressure (value represented by number in FIG. 2) is set for each engine speed and engine torque. The target boost pressure is set to a value that can ensure sufficient power performance and exhaust gas performance under the condition of each engine speed and engine torque. Also, the engine torque can be calculated from the engine parameter such as the fuel injection amount.

After calculating the target boost pressure, the assist amount by the electric motor 2c is controlled such that the actual boost pressure becomes close to the target boost pressure. However, since the rotational speed of the electric motor 2c can easily be controlled, it is effective that the control of the assist amount also directs the rotational speed of the electric motor 2c.

More particularly, the electric motor control unit 23 calculates the target pressure ratio from the ratio of the inlet pressure measured by the inlet pressure sensor 14 and the target boost pressure, and also calculates the current pressure ratio from the ratio of the boost pressure measured by the boost pressure sensor 13 and the inlet pressure.

Also, since the inlet pressure measured by the inlet pressure sensor 14 is the inlet pressure of the low-pressure stage compressor 3b, both the pressure ratios calculated herein (the target pressure ratio and the current pressure ratio) are values based on the inlet-to-outlet pressure ratio of the low-pressure stage compressor 3b and the inlet-to-outlet pressure ratio of the high-pressure stage compressor 2b. However, when the low-pressure stage turbocharger 3 is in a driven state, the exhaust energy is large so that the actual boost pressure is equal to or higher than the target boost pressure. Therefore, the assist by the electric motor 2c is not performed in practice (although the assist by the electric motor 2c may be performed, the fuel efficiency is deteriorated in reverse by the power consumption). That is, the actual boost pressure is less than the target boost pressure only when the engine speed is within a low speed range. In such a range, the low-pressure stage turbocharger 3 is not driven. Therefore, the inlet pressure measured by the inlet pressure sensor 14 becomes substantially equal to the inlet pressure of the high-pressure stage compressor 2b. By taking the ratio of the inlet pressure and the boost pressure, the inlet-to-outlet pressure ratio of the high-pressure stage compressor 2b can be obtained.

Thereafter, the electric motor control unit 23 calculates the target turbo rotational speed by referring to the high-pressure stage compressor characteristics map 24 at the target pressure ratio and the intake air flow rate measured by the intake air flow rate measurement unit, and also calculates the current turbo rotational speed by referring to the high-pressure stage compressor characteristics map 24 at the current pressure ratio and the intake air flow rate. An example of the high-pressure stage compressor characteristics map 24 used at this time is illustrated in FIG. 3.

Figure 3:
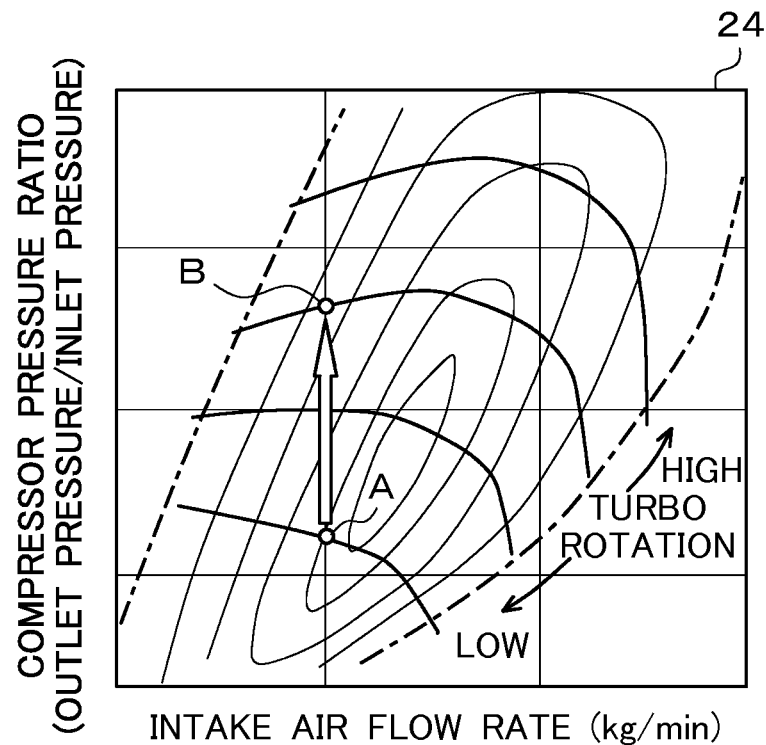
FIG. 3 is a diagram illustrating an example of a high-pressure stage compressor characteristics map used in the turbocharger system of FIG. 1.

As illustrated in FIG. 3, the high-pressure stage compressor characteristics map 24 is a map that represents a relationship between the inlet-to-outlet pressure ratio of the high-pressure stage compressor 2b and the intake air amount for each turbo rotational speed of the high-pressure stage turbocharger 2, and represents the characteristics of the high-pressure compressor.

In FIG. 3, for example, when the current pressure ratio and the intake air flow rate are placed at point A, and the target pressure ratio and the intake air flow rate are placed at point B, a rotational speed required to increase can be calculated from a difference between the turbo rotational speed (current turbo rotational speed) at point A and the turbo rotational speed (target turbo rotational speed) at point B. The electric motor control unit 23 controls the electric motor 2c according to the rotational speed required to increase (for example, controls the magnitude of the voltage applied to the electric motor 2c), and performs control such that the turbo rotational speed becomes the target turbo rotational speed.

As described above, the turbocharger system 1 according to the present embodiment is provided with the power-assisted turbocharger including the electric motor 2c that assists the drive force of the high-pressure stage compressor 2b, as the high-pressure stage turbocharger 2.

In this way, when the electric motor 2c is driven, a sufficient boost pressure can be obtained regardless of the engine state, and a sufficient boost pressure can be obtained even in a zone where the exhaust energy is very small, that is, a zone where the engine speed is extremely low. Therefore, power performance (extremely-low-speed torque) in the zone where the engine speed is extremely low can be improved.

Figure 4:
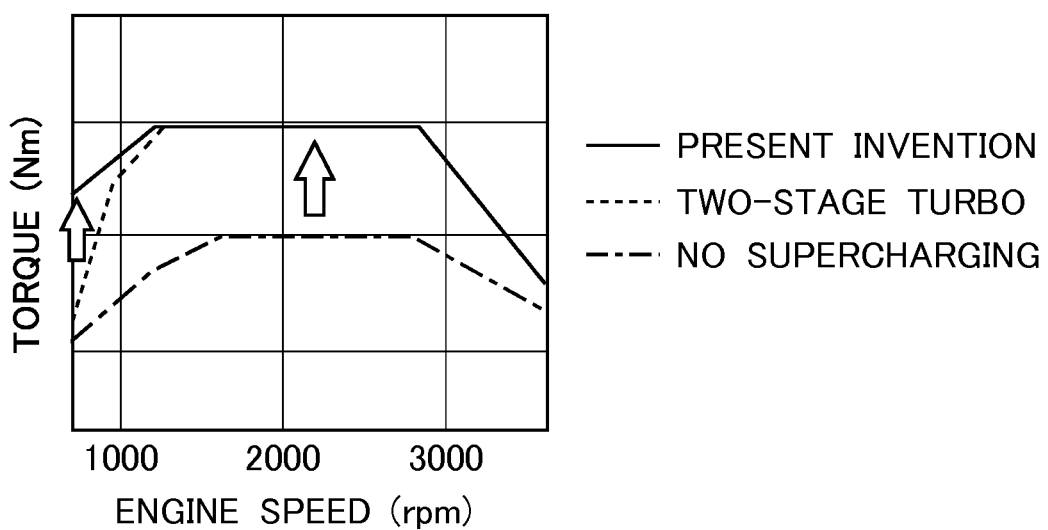
FIG. 4 is a diagram illustrating full-load torque characteristics in the cases of a turbocharger system of FIG. 1, a typical series two-stage turbo, and no supercharging, respectively.

FIG. 4 illustrates full-load torque characteristics in the cases of the turbocharger system 1 (solid line) of the present invention, the typical series two-stage turbo (dashed line), and no supercharging (dashed-dotted line), respectively. As illustrated in FIG. 4, the series two-stage turbo can improve the torque, in particular, in the middle-low speed zone, as compared with no supercharging. However, according to the present invention, in addition to this, the torque can be further improved in the extremely low speed range.

In this way, according to the turbocharger system 1 of the present invention, the torque can be improved in the extremely low speed range, enabling low fuel consumption by engine downsizing more than the conventional one. Also, even when the engine is not downsized, the improvement of the extremely-low-speed torque can speed up a reduction gear (high geared) and achieve low fuel consumption.

It is apparent that the present invention is not limited to these embodiments, and various modifications can be made without departing from the scope of the present invention.

For example, the electric motor 2c is described above as being configured to be driven when the boost pressure measured by the boost pressure sensor 13 is lower than the target boost pressure obtained by the target boost pressure map 22, but the indicator of driving the electric motor 2c is not limited to the boost pressure. For example, the inlet-to-outlet pressure ratio of the high-pressure stage compressor 2b, an air excess ratio of exhaust or intake, an intake air amount, and the like may be set as the indicator, and the electric motor 2c may be configured to be driven when the actual measured value is less than the target value.

Also, a rotational speed sensor may be provided to detect the turbo rotational speed of the high-pressure stage turbocharger 2, and the assist amount by the electric motor 2c may be controlled according to a discrepancy between the turbo rotational speed detected by the rotational speed sensor and the target turbo rotational speed.

The invention claimed is:

1. A turbocharger system comprising:
a high-pressure stage turbocharger including a high-pressure stage turbine disposed on an exhaust passage and driven by exhaust, and a high-pressure stage compressor disposed on an intake passage and driven by a rotational torque of the high-pressure stage turbine;
a low-pressure stage turbocharger including a low-pressure stage turbine disposed on the exhaust passage of a more downstream side than the high-pressure stage turbine and driven by exhaust, and a low-pressure stage compressor disposed on the intake passage of a more upstream side than the high-pressure stage compressor and driven by a rotational torque of the low-pressure stage turbine;
a high-pressure stage turbine bypass line disposed on the exhaust passage and bypassing the high-pressure stage turbine;
a high-pressure stage compressor bypass line disposed on the intake passage and bypassing the high-pressure stage compressor;
a low-pressure stage turbine bypass line disposed on the exhaust passage and bypassing the low-pressure stage turbine;
a high-pressure stage turbine bypass valve disposed on the high-pressure stage turbine bypass line, closed in a zone where the engine speed is low and the exhaust energy is small, and opened in a zone where the engine speed is high and the exhaust energy is large, and an opening degree thereof is adjusted in a middle zone between the zone where the engine speed is low and the zone where the engine speed is high;
a high-pressure stage compressor bypass valve disposed on the high-pressure stage compressor bypass line, closed in a zone where the engine speed is low and the exhaust energy is small, opened in a zone where the engine speed is high and the exhaust energy is large, and closed in a middle zone between the zone where the engine speed is low and the zone where the engine speed is high; and
a low-pressure stage turbine bypass valve disposed on the low-pressure stage turbine bypass line, closed in a zone where the engine speed is low and the exhaust energy is small, closed in a zone where the engine speed is high and the exhaust energy is large, opened in a zone where the capacity of the low-pressure stage turbocharger is exceeded, and closed in a middle zone between the zone where the engine speed is low and the zone where the engine speed is high,
wherein the high-pressure stage turbocharger includes a power-assisted turbocharger including an electric motor that assists a drive force of the high-pressure stage compressor.

2. The turbocharger system according to claim 1, comprising an electric motor control unit that drives the electric motor when a boost pressure, which is an outlet pressure of the high-pressure stage compressor, is smaller than a target boost pressure, which is determined by an engine speed and an engine torque.

3. The turbocharger system according to claim 2, comprising:
a boost pressure sensor that measures the boost pressure, and a target boost pressure map in which the target boost pressure is set for each engine speed and engine torque;
an intake air flow rate measurement unit that measures an intake air flow rate;
an inlet pressure sensor that measures an inlet pressure of the high-pressure stage compressor; and
a high-pressure stage compressor characteristics map that is a relationship of a pressure ratio of the inlet pressure and the boost pressure with respect to the intake air flow rate for each turbo rotational speed in the high-pressure stage compressor,
wherein the electric motor control unit calculates a target pressure ratio from a ratio of the inlet pressure measured by the inlet pressure sensor and the target boost pressure, calculates a target turbo rotational speed by referring to the high-pressure stage compressor characteristics map at the target pressure ratio and the intake air flow rate measured by the intake air flow rate measurement unit, and controls a drive amount by the electric motor according to a discrepancy between the calculated target turbo rotational speed and a current turbo rotational speed.

* * * * *